United States Patent [19]

Freitag et al.

[11] Patent Number: 4,840,113
[45] Date of Patent: Jun. 20, 1989

[54] LOUVER VENT FOR THE VENTILATION OF A MOTOR VEHICLE PASSENGER COMPARTMENT

[75] Inventors: Elmar Freitag, Weil der Stadt; Karl-Heinz Weller, Gerlingen; Hans-Wilhelm Trube, Herrenberg, all of Fed. Rep. of Germany

[73] Assignee: Daimler-Benz Aktiengesellschaft, Stuttgart, Fed. Rep. of Germany

[21] Appl. No.: 205,836

[22] Filed: Jun. 13, 1988

[30] Foreign Application Priority Data

Jun. 13, 1987 [DE] Fed. Rep. of Germany ....... 3719835

[51] Int. Cl.⁴ .............................. F24F 13/15
[52] U.S. Cl. .......................... 98/2; 98/40.27
[58] Field of Search ............ 98/2, 40.24, 40.26, 98/40.27, 121.2

[56] References Cited

U.S. PATENT DOCUMENTS 4,377,107  3/1983  Izumi ........................... 98/2

FOREIGN PATENT DOCUMENTS

| 2814191 | 10/1979 | Fed. Rep. of Germany | 98/2 |
| 3001163 | 7/1981 | Fed. Rep. of Germany | 98/2 |
| 65534 | 4/1982 | Japan | 98/2 |
| 184434 | 10/1983 | Japan | 98/2 |
| 169044 | 9/1985 | Japan | 98/2 |
| 226652 | 11/1985 | Japan | 98/40.27 |

Primary Examiner—Harold Joyce
Attorney, Agent, or Firm—Barnes & Thornburg

[57] ABSTRACT

A louver vent is disclosed which has successive levels, in flow direction, of in each case one set of slats which are pivoted by means of a joint operating handle. In order to provide air deflection corresponding to the associated slat position, at least one single slat is positioned ahead of the row of slats first subjected to flow, which single slat is arranged close to a housing wall of the slat of one of the rows of slats which is in the same alignment close to the wall. The single slat is moved, during the shifting of the operating handle, into a selected end position against the pivoting direction of the actuated slats after passing over their central position, so that the air stream is directed away from the housing wall and in the direction of the associated, oppositely disposed slats.

8 Claims, 2 Drawing Sheets

LOUVER VENT FOR THE VENTILATION OF A MOTOR VEHICLE PASSENGER COMPARTMENT

BACKGROUND AND SUMMARY OF THE INVENTION

The invention relates to a Louver vent for the ventilation of a motor vehicle passenger compartment. A set of mutually parallel slats which can be pivoted together about mutually parallel axes are arranged in each case in two successive Levels in flow direction, the axes and the pivoting direction of the slats of the two closely spaced successive sets of slats extending perpendicular to each other in the projection of the two cross-sections, and having a joint operating handle which can be displaced on a horizontally directed front slat for the pivoting of the slats of the two sets of slats.

Such an air outlet vent is known from German published, unexamined application (DOS) No. 2,814,191. This has a good directional action around the central position of the slats, which deteriorates however, towards the extreme positions, so that it is not possible to achieve an air deflection corresponding to the alignment of the slats. This can be explained in the case of slats having a central and a rear pivot axis by the fact that the leading slat edge pointing in the direction of deflection of the first slat in each case comes very close to the associated vent wall and a deflection of air towards this wall consequently occurs. The air accelerated through the remaining narrow gap then leaves with a significant undeflected component and is superimposed on the air flow properly deflected by the second slat and further slats. It would probably be possible by appropriate dimensional design to bring the leading slat edge of the first slats in each case into contact with the associated vent wall in the maximum position of displacement, but then there occurs ahead of this slat a turbulence which adversely affects the conditions of flow onto the subsequent slat which is particularly important for achieving the greatest possible angle of deflection. If the slats are provided with a pivot axis at the front, a constant, relatively large gap remains between the leading slat edge of the particular slat pointing in the direction of deflection and the respectively associated vent wall, so that a large proportion of air is undeflected and this leaves the vent with a counteracting effect on the desired deflection.

An object of the invention is to further develop a louver vent of the type mentioned at the beginning in such a way that an air deflection corresponding to the slat position is achieved irrespective of the position of the slat pivot axis in the extreme deflection positions of the slats.

This object is achieved by providing additional slat means adjacent housing edge walls and coupled with the operation flow to optimize air flow.

An improved flow onto the front slats, deflecting the air upwards and downwards, is achieved if the perpendicularly positioned slats have cutouts which receive in a pivotally movable manner the two horizontally aligned single slats mounted on the wall.

Other objects, advantages and novel features of the present invention will become apparent from the following detailed description of the invention when considered in conjunction with the accompanying drawings.

DETAILED DESCRIPTION OF THE DRAWINGS

Figure 2:
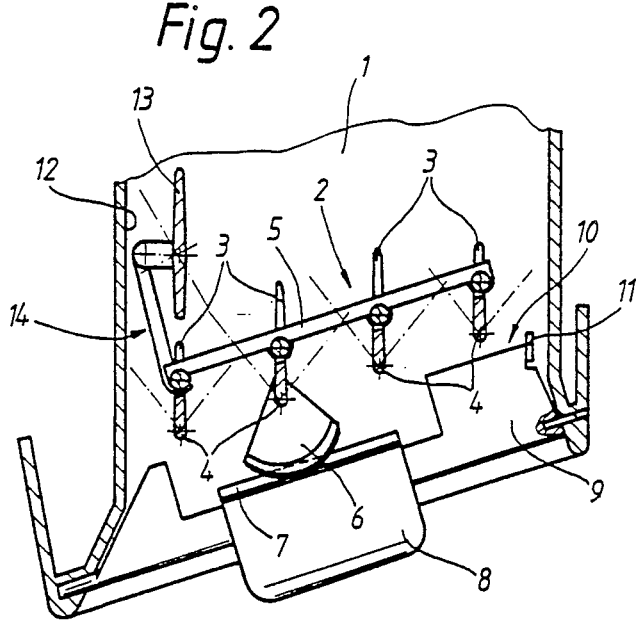
FIG. 2 shows a section along the Line II—II in FIG. 1.

A housing 1 of a louver vent is fitted with—seen in the direction of flow—a first row of slats 2 with mutually parallel, vertically positioned slats 3, which can be pivoted about front-lying, mutually parallel axes 4. To transfer the pivoting movement imparted on one of the slats 3 to the other slats 3, the latter are interconnected by a coupling element 5, as shown in FIG. 2. One of the slats 3 is provided with an integrally attached toothed segment 6, which meshes with a toothed rack 7, which is a component part of an operating handle 8. The latter is displaceably arranged on a slat 9 which belongs to a row of slats 10 which is positioned behind the row of slats 2—seen in the direction of flow—and is horizontally aligned. To transfer the pivoting movement imparted on the lowest slat 9 via the operating handle 8 to the remaining, mutually parallel slats 9, the latter are likewise interconnected like the slats 3 by means of a coupling element 11.

As emerges from FIG. 2, the slats 3 can be pivoted from the central position, represented by solid lines, into the indicated extreme positions by shifting the operating handle 8 to the left and right. Close to the housing wall 12 on the left-hand side, a vertically aligned single slat 13 is pivotally mounted and positioned ahead of the outermost of the slats 3 in the same alignment, the single slat 13 being coupled to the adjusting movement of the row of slats 2 by means of a lever arrangement 14.

If the operating handle 8 is moved to the left out of the position shown, the trailing edge of the slats 3 pivots to the right and the single slat 13 is provided by means of the lever arrangement 14 oppositely to the slats 3, the trailing edge of the single slat 13 coming so close to the housing wall 12 that a scooping of air takes place and the air stream thus created is directed away from the housing wall 12 and in the direction of the oppositely disposed slats 3. The latter cause a deflection of the air, the outlet direction of the air streaming out at high speed corresponding to the position of the slats 3. If such a louver vent is installed for example on the left side of the dashboard of a motor car, in the position described of the slats 3 and of the single slat 13, the front left side window is prevented from misting up even in a front area which is otherwise not reached by the air stream.

Figure 1:
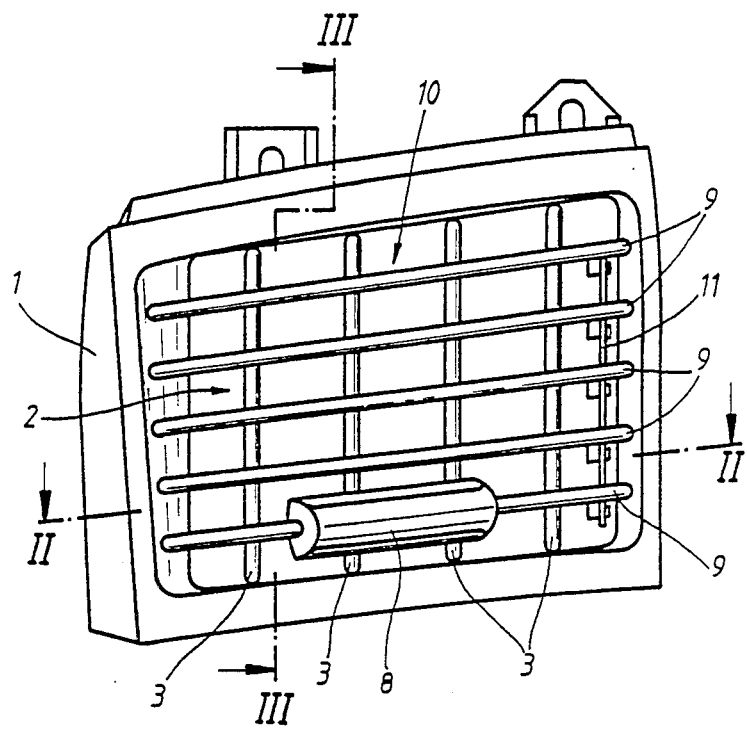
FIG. 1 schematically shows a front view of a louver vent having two rows of slats arranged on successive levels in the direction of flow, constructed in accordance with a preferred embodiment of the present invention.
Figure 3:
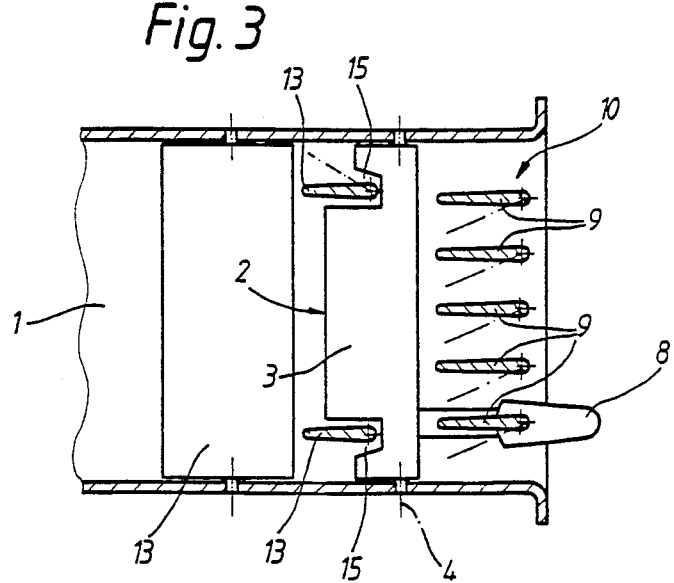
FIG. 3 shows a section corresponding to the Line III—III in FIG. 1 and illustrating a modified exemplary embodiment of the invention

The exemplary embodiment according to FIG. 3 corresponds substantially to that of FIGS. 1 and 2, so that the same item numbers have also been used for identical parts. The louver vent is provided with a total of four single slats 13, of which only three can be seen, however, the first single slat 13, seen in the direction of flow, being arranged in mirror symmetry with the single slat 13 according to FIG. 2. This also provides a strong deflection of air to the right, so that such a vent can be recessed in the dashboard both on the extreme left and on the extreme right.

Two further single slats 13 are fitted in cutouts 15 of the rear slats 3, are aligned horizontally and are operated by coupling elements (not shown) during pivoting of the front slats 9. If, for example, the operating handle 8 is moved upwards, the slats 9 pivot into the position shown by the dot-dashed lines and the air is deflected upwards. The upper single slat 13 is in this case pivoted oppositely—as indicated—while the lower single slat 13 remains in its central position. The displaced upper single slat 13 causes the air to be directed to the next slats 9 and to be strongly deflected by the latter, so that the direction of the accelerated air leaving corresponds to the pivoted position of the slats 9.

If, in a way not shown, the operating handle 8 is moved downwards, the upper single slat 13 remains in its central position, which the trailing edge of the lower single slat 13 moves downwards. This produces a highly deflected air stream in the direction of the vehicle floor.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Louver vent for the ventilation of a motor vehicle passenger compartment, comprising a first and second row of mutually parallel slats wherein the slats in each row can be pivoted together about mutually parallel axes and wherein the first and second row of slats are arranged in two successive levels in flow direction, the axes and the pivoting direction of the slats of the two rows of slats are closely spaced and one row of slats extends perpendicular to the other row, the two rows of slats have a joint operating handle which can be displaced on a horizontally directed front slat of one of the rows for the pivoting of the slats of the two rows of slats and wherein there is at least one single deflection slat positioned ahead of one of the rows of slats which is first subjected to flow, said at least one single deflection slat is arranged close to a housing wall surrounding the one of the rows of slats and which is in the same alignment close to the wall as the one of the rows of slats, in a center position, and wherein said at least one single deflection slat is moved during the shifting of the operating handle into a selected end position corresponding to the pivoting direction of the one row of actuated slats by the handle after the one row of actuated slats passes over a central position, so that an air stream is directed away from the housing wall into the direction of the one row of pivoted actuated slats only after the one row of slats has been pivoted past its central position.

2. Louver vent according to claim 1, wherein the one row of slots which is perpendicular positioned with respect to the second row of slats has cutouts which receive in a pivotally movable manner at least two deflection slats which are disposed horizontally aligned with respect to the wall and near to the at least one single deflection slat mounted at the wall.

3. Louver vent arrangement for controlling air flow into a vehicle passenger space or the like, comprising:
   a first row of movable air deflection slats arranged substantialy parallel to one another,
   a second row of movable air deflection slats arranged substantially parallel to one another and disposed downstream of said first row of slats,
   a joint operating handle for jointly moving the first and second row of slats,
   and at least one housing air deflection slat means dispsoed adjacent a housing wall means of louver housing at a location upstream of said at least one of the first and second rows of slats, said housing air deflection slat means being movable operable by the joint operating handle from a position wherein it is in parallel with the wall means and deflects no air, into a position at an angle with said wall means for directing air flow away from the housing wall means toward a respective oppositely directed slat of one of the first slats has been moved past a central position of said first row of slats.

4. Louver vent arrangement according to claim 3, wherein said housing air deflection slat means includes a first deflection slat disposed upstream of and substantially parallel to a slat of the first row of slats, said first row of slats and said first deflection slat being pivotably movable about respective parallel pivot axes.

5. Louver vent arrangement according to claim 4, wherein said housing air deflection slat means includes a second deflection slat disposed upstream of and substantially parallel to a slat of the first row of slats and arranged symmetrically with respect to the first deflection slat adjacent an opposite housing wall.

6. Louver vent arrangement according to claim 5, wherein said housing air deflection slat means includes third and fourth deflection slats arranged in cut-outs of the slats of said first row of slats, said third and fourth deflection slats being pivotal about axes extending perpendicular to the pivot axes of the first and second deflection slats.

7. Louver vent arrangement according to claim 3, wherein said first and second rows of slats are pivotally mounted with pivot axes of the first row being perpendicular to the pivot axes of the second row, and wherein said handle is movably carried at a slat of said second row.

8. Louver vent arrangement according to claim 6, wherein said first and second rows of slats are pivotally mounted with pivot axes of the first row being perpendicular to the pivot axes of the second row, and wherein said handle is movably carried at a slat of said second row of slats.

* * * * *